Aug. 2, 1960 P. E. BESSIERE 2,947,258
SELF-REGULATING RECIPROCATING PISTON PUMPS, IN
PARTICULAR FOR THE INJECTION OF FUEL INTO
INTERNAL COMBUSTION ENGINES
Filed July 7, 1958 4 Sheets-Sheet 1

PIERRE E. BESSIERE
INVENTOR

BY *Bailey, Stephens + Huettig*

ATTORNEY

Aug. 2, 1960 P. E. BESSIERE 2,947,258
SELF-REGULATING RECIPROCATING PISTON PUMPS, IN
PARTICULAR FOR THE INJECTION OF FUEL INTO
INTERNAL COMBUSTION ENGINES
Filed July 7, 1958 4 Sheets-Sheet 3

INVENTOR
PIERRE E. BESSIERE
BY
ATTORNEY

Aug. 2, 1960 P. E. BESSIERE 2,947,258
SELF-REGULATING RECIPROCATING PISTON PUMPS, IN
PARTICULAR FOR THE INJECTION OF FUEL INTO
INTERNAL COMBUSTION ENGINES
Filed July 7, 1958 4 Sheets-Sheet 4

PIERRE E. BESSIERE
INVENTOR

BY Bailey, Stephens & Huettig
ATTORNEY

United States Patent Office 2,947,258
Patented Aug. 2, 1960

2,947,258

SELF - REGULATING RECIPROCATING PISTON PUMPS, IN PARTICULAR FOR THE INJECTION OF FUEL INTO INTERNAL COMBUSTION ENGINES

Pierre Etienne Bessière, 55 Blvd. Charcot, Neuilly-sur-Seine, France

Filed July 7, 1958, Ser. No. 746,939

Claims priority, application France July 8, 1957

16 Claims. (Cl. 103—41)

The present invention relates to self-regulating reciprocating action pumps and it is more especially, but not exclusively, concerned with piston pumps for use in connection with internal combustion engines such as diesel engines.

In my U.S. patent application, S.N. 673,343, filed July 22, 1957, for "Improvements in Reciprocating Liquid Pumps, and in Particular in Fuel Injection Pumps," I described a reciprocating action pump including a reciprocating or "shuttle" part, preferably in the form of a piston, the forward stroke of which is produced by the pressure of the liquid delivered by the main pump piston during its delivery stroke, said forward stroke taking place against the resilient action of a return force, whereas the return stroke of said shuttle produced by said force during the suction stroke of the main pump piston is braked by a throttled passage provided in the circuit through which liquid is driven by the shuttle during the return stroke thereof. Such a slowing down of the return movement of the shuttle produces, for pump driving speeds above a given value, the so-called "liquid abutment" phenomenon which reduces the amount of liquid delivered by the pump on every stroke thereof.

The object of the present invention is to provide a pump of this kind which is better adapted to meet the requirements of practice, especially concerning the fineness of regulation thereof, than those used up to now.

The essential feature of my invention consists in providing means for varying the cross section of said throttled passage in accordance with variations of the pump driving speed or of the speed of the engine on which said pump is mounted when said pump is a fuel injection pump.

Preferred embodiments of the present invention will be hereinafter described with reference to the accompanying drawings, given merely by way of example and in which.

Each of the pumps shown by the drawings is a self-regulating reciprocating action pump intended to feed fuel to the injector or injectors of an internal combustion engine.

The pump includes a main cylinder 1 cooperating with a main piston 2 driven in any suitable manner from the shaft of the internal combustion engine to be fed with fuel by the pump. Piston 2 may for instance be driven through a cam (not shown).

Said piston 2 controls the outlet of a feed conduit 4 into cylinder 1.

The pump further includes an auxiliary piston or shuttle 5 movable in an auxiliary cylinder 6 and dividing this cylinder into two chambers $6_a$ and $6_b$.

When piston 2, during its upward stroke, delivers, through means which will be hereinafter more explicitly described, fuel into chamber $6_a$, shuttle 5 is moved upwardly, thus compressing a return spring 7 located in chamber $6_b$. The upward movement of shuttle 5 stops when said shuttle places chamber $6_a$ into communication with a discharge conduit 8.

From chamber $6_b$ starts a delivery conduit 9 provided with a check valve 10. Chambers $6_a$ and $6_b$ are connected together by a conduit 11 in which is provided a throttled passage so as to slow down, or to brake, the liquid flowing out through said conduit 11 from chamber $6_a$ toward chamber $6_b$ when, under the action of return spring 7, shuttle 5 is moving downwardly. This return movement of the shuttle takes place during the period of time elapsing between the beginning of a downward movement of piston 2 and the beginning of the next upward stroke thereof.

Figure 1:
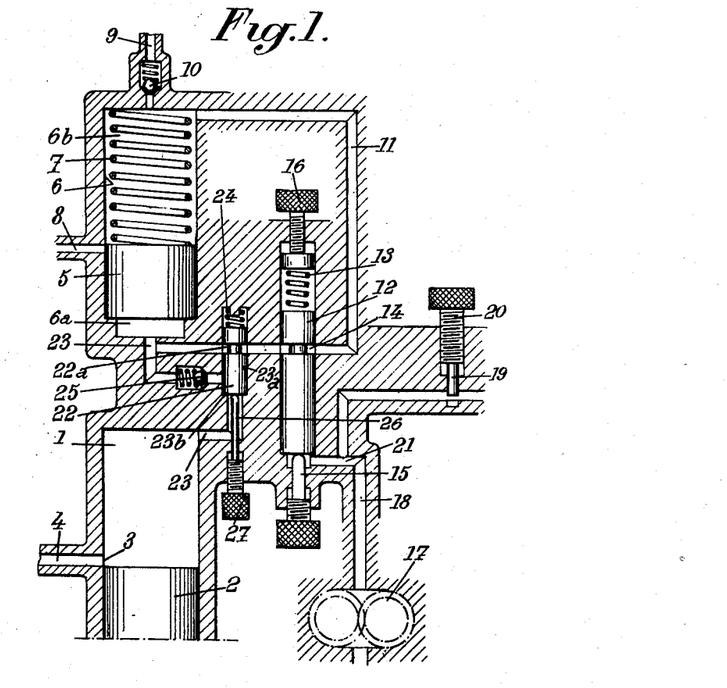
Fig. 1 is a diagrammatic axial sectional view of a fuel injection pump made according to the invention.
Figure 3:
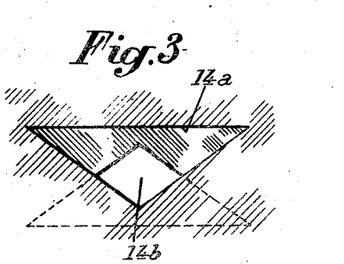
Fig. 3 shows a detail in the construction of another modification.

Concerning the throttled passage provided in conduit 11 to brake the flow of fuel through said conduit, I provide, according to the main feature of the invention, means for causing the cross section of this throttled passage to vary in accordance with variations of the speed at which the pump piston 2 is driven, or of an analogous speed, at least within a given range of variation of said speed. The speed above referred to may be for instance the speed of rotation of the shaft of the engine on which the pump is mounted or a speed depending upon said shaft rotation speed. In the construction of Fig. 1, I provide, for the above mentioned purpose, in conduit 11, a throttle valve 12, in the form of a slide valve movable against a return force produced for instance by a spring 13, said slide valve 12 being provided with a groove 14 (or with a channel $14_a$ extending therethrough, as shown by Fig. 3), this groove or this passage determining, in cooperation with conduit 11, a passage the cross section $14_b$ of which is the smaller as slide valve 12 is moved to a greater distance in the upward direction.

The cross section of passage $14_b$ may be given different initial values by means of an adjustable abutment 15 against which slide valve 12 is applied by return spring 13, the initial force exerted by said spring being adjustable by means of a screw 16.

On Fig. 1, abutment 15 is shown in its most retracted position, such that groove 14 fully clears conduit 11.

In order to throttle conduit 11 variably in accordance with the speed of the engine, slide valve 12 is displaced by a force which is variable in accordance with said speed, said force being supplied by a speed governor.

I may provide different laws of variation of the cross section of the throttled passage as a function of the speed but, as a rule, this cross section is reduced when the speed increases.

In the device shown by Fig. 1, the above mentioned variable force is supplied by the pressure of a liquid, such as oil, delivered by a constantly running auxiliary pump the delivery rate of which, measured in volume, is proportional to the speed at which it is driven. This auxiliary pump is for instance a gear-pump 17 driven by the engine which also drives the main pump piston 2. The delivery conduit 18 of gear-pump 17 is throttled by means of a needle valve 19 carried by an adjusting screw 20. Thus the delivery pressure of auxiliary pump 17 increases when the speed at which it is driven increases, this pressure increasing more rapidly, as it is known, than the speed itself.

The pressure existing in conduit 18 is transmitted through a conduit 21 to the space under the lower end of slide valve 12.

As already stated above, the main piston 2 must deliver fuel into the chamber $6_a$ of cylinder 6 so as to drive shuttle 5 upwardly, but this fuel must be transferred by the downward movement of the shuttle, through conduit 11, into chamber $6_b$. To ensure this liquid displacement, according to a feature of the invention, a valve device 22 which closes conduit 11 during the upward movement of the main pump piston 2 and which opens it during the downward movement of the same piston, further controls the conduit 23 through which fuel passes from cylinder 1 to chamber $6_a$.

For this purpose, valve device 22 is made in the form of a slide valve the lower end of which is in the form of a piston slidable in a cylindrical space $23_a$ belonging to conduit 23 and interposed between two portions of said conduit at right angles to each other. A spring 24 urges slide valve 22 downwardly toward a position where it rests upon a shoulder $23_b$ at the bottom end of space $23_a$. When slide valve 22 is resting upon this shoulder, the groove $22_a$ of this slide valve fully clears conduit 11. In this position, slide valve 22 cuts off the communication between the two above mentioned portions of conduit 23. The upper portion which opens into chamber $6_a$ may be provided with a check valve 25 but such a check valve may be dispensed with.

According to still another feature of this invention, said valve device 22 may also be used to throttle conduit 11 more or less.

For this purpose, I provide an abutment 26 adjustable by means of a screw 27 and capable of keeping slide valve 22 at some distance above shoulder $23_b$ so that the groove $22_a$ of slide valve 22 only partly clears conduit 11 when said slide valve 22 is applied by spring 24 against said adjustable abutment 26.

In the embodiment of Fig. 1, slide valve 22, acting as a throttling member independent of the speed, but adjustable, is mounted in series with throttle valve 12 the effect of which depends upon the value of the speed. However, slide valve 22 might be used as an adjustable throttling member (as above described) even when conduit 11 is provided with no other throttling means.

The operation of the device shown on Fig. 1 is as follows.

The main pump piston 2, moving upwardly, first closes the outlet 3 of feed conduit 4. Then, it causes slide valve 22 to move upwardly so that this slide valve closes conduit 11 and simultaneously places the two above mentioned portions of conduit 23 in communication with each other through space $23_a$. Consequently, fuel is delivered into the chamber $6_a$ of cylinder 6 and causes shuttle 5 to move upwardly in said cylinder until it opens the discharge conduit 8. The upward movement of shuttle 5 simultaneously causes the fuel present in chamber $6_b$ to flow through delivery conduit 9 toward the injector or injectors of the engine. As soon as piston 2 starts on its next downward stroke, slide valve 22 drops back upon the abutment constituted either by shoulder $23_b$ or by rod 26, and shuttle 5, moving down in cylinder 6 under the action of return spring 7, causes fuel to be transferred from chamber $6_a$ through outflow conduit 11 to chamber $6_b$.

If slide valve 22 and/or slide valve 12 are stopped by abutment 26 and/or abutment 15 respectively in a position where groove $22_a$ and/or groove 14 produce a throttling in conduit 11, this flow of the liquid through conduit 11 and therefore the downward movement of shuttle 5 are braked by this throttling effect whatever be the speed at which the pump is being driven.

But even if abutments 26 and 15 are adjusted to permit a full opening of conduit 11 by slide valves 22 and 12, conduit 11 starts being throttled by slide valve 12 when the speed at which pump 17 is driven exceeds a given value, because in these conditions, the pressure in conduit 18 becomes sufficiently high to displace slide valve 12 upwardly and thus to throttle conduit 11 while compressing spring 13. This value of the speed depends on the one hand, upon the initial compression of spring 13 and, on the other hand, upon the throttling of conduit 18 by needle valve 19.

The higher the speed the smaller the cross section of the throttled passage determined by valve 12. This cross section may become zero. In this last case, no fuel is transferred from chamber $6_a$ to chamber $6_b$ and consequently no fuel is fed to the injector or injectors of the engine.

However, before the delivery of fuel is wholly stopped, I obtain, due to the braking action of the throttled passage or passages of conduit 11, the production of the phenomenon called "liquid abutment," which reduces the amount of fuel fed from chamber $6_a$ to chamber $6_b$ and consequently the amount of fuel injected on every pump stroke.

In view of the fact that, according to the main feature of the invention, the cross section of the throttled passage $14_b$ (Fig. 3) of conduit 11 is not constant but decreases for increasing speeds above a given value, two factors simultaneously produce a quick increase of the liquid abutment effect. These two factors are on the one hand, the increase of the speed of the main pump piston 2 due to the increase of the engine speed and, on the other hand, the slowing down of the downward movement of shuttle 5 due to the increase of the braking action caused by an increased throttling of conduit 11.

I thus obtain a high accuracy adjustment and the certainty that the engine never runs above a predetermined upper limit speed.

Figure 2:
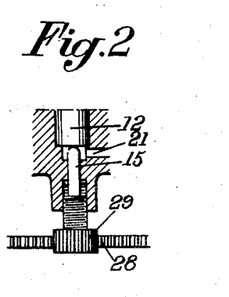
Fig. 2 shows a modification.

According to a modification of the device shown by Fig. 1, slide valve 12 is controlled by a mechanical governor (not shown) which acts through a rack 28 on a pinion 29 fixed to the free end of the screw which supports abutment 15 (see Fig. 2). The action of the governor exerted through abutment 15 is quite analogous to that of the hydraulic governor above described.

According to another embodiment of the invention, in order to adapt to every particular case the law according to which the cross section of the throttled passage varies, the throttling of conduit 11, instead of being produced by a slide valve provided with a groove, is obtained (Fig. 3) by a slide valve provided with a transverse channel or passage $14_a$ so as to obtain the cooperation of two passages which more or less overlap each other. In the construction of Fig. 3, the two cooperating passages are of triangular cross section. When these passages are in the position illustrated by Fig. 3, the throttled passage $14_b$ has a cross section in the form of a lozenge. Of course, the cooperating passages of conduit 11 and slide valve 12 might have any suitable shape for instance that of a semi-circle, that of a rectangle, and so on.

In pumps as shown by Fig. 1, the hydraulic regulator which controls slide valve 12 has a fixed (and adjustable) throttled passage in its delivery conduit. However, it is often advantageous to vary the cross section of this last mentioned throttled passage automatically in accordance with the variations of a factor upon which depends the amount of fuel delivered by the pump, this factor being possibly also the speed of the engine on which the pump is mounted, that is to say the speed at which auxiliary pump 17 is driven, Thus, according to Fig. 4, a slide valve 124 inserted across the portions 21$_a$ of conduit 21 is caused to move under the effect of the pressure existing in the delivery conduit 18 of auxiliary pump 17. For this purpose, said conduit 18 is connected through a conduit 130 with the bottom end of the cylinder in which slide valve 124 is movable. The throttled passage in conduit section 21$_a$ is controlled by a groove 124$_a$ of said valve 124. Slide valve 124 is urged by a return spring 125 against an abutment 127.

Figures 4, 5, 6, 7, 8:
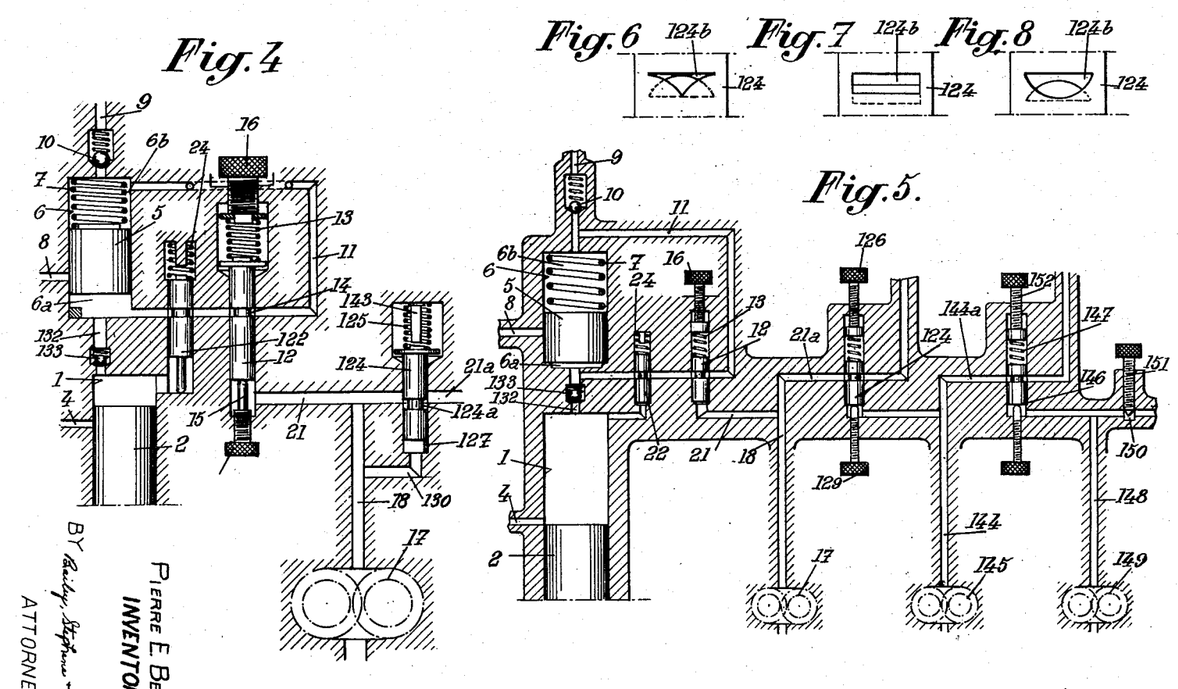
Fig. 4 shows another pump according to the invention in which the means for controlling the throttled passage is operated by a hydraulic governor.
Fig. 5 shows a similar pump combined with a modification of the hydraulic governor.
Figs. 6 to 8 inclusive illustrate modifications of a detail of the hydraulic governor.

In a first embodiment, which is not that shown by Fig. 4, groove 124$_a$ is arranged in such manner that slide valve 124, as soon as it begins to move against the action of spring 125 reduces the cross section of the last mentioned throttled passage and this the more so as the delivery pressure of auxiliary pump 17 rises. In this embodiment, there is some risk of over regulation since an increase of the pressure in conduit 18 causes a reduction of the cross section of the throttled passage through groove 124$_a$ which in turn causes a further increase of the pressure in conduit 18 and so on. It may then happen that the correction of the delivery rate of the pump is effected quicker than the change in the speed of the engine and that consequently slide valves 124 and 12 are given a periodical movement. In order to avoid this phenomenon, means may be provided to brake the displacement of slide valve 124 and of slide valve 12, preferably by providing a throttled section in conduit 130 and/or a throttled section in conduit 21, these throttled sections being either identical or different. The slide valves may also be provided with damping means constituted for instance by dash-pots. All these means are intended to damp the transmission of sudden pressure variations to the respective slide valves.

Finally, I may also adapted the operation of the governor to some cases met in actual practice by making use, for slide valve 124, of cooperating cross sections such as shown by way of example on Figs. 6, 7 and 8. In such cases, slide valve 124 is provided, instead of the groove 124$_a$, with a passage 124$_b$ of triangular, semi-circular or other suitable shape and this passage is made to cooperate with a portion of conduit 21$_a$ having an analogous cross section.

Anyway, in the embodiment which has just been described and according to which an increase of the speed produces a reduction of the cross section of the throttled passage provided in the discharge conduit of the auxiliary pump, I obtain, in response to a rise of the speed, an increase of the fineness of regulation, the term "fineness" designating the reciprocal of the ratio of the momentaneous speed which constitutes the adjustment factor (given in number of revolutions per unit of time) to the variation undergone by said speed (this variation being also given in number of revolutions) to achieve the desired regulation effect.

In some cases, it is of interest to obtain a fineness which for all values of the speed or at least for a large range of different speeds, remains at least approximately constant. The embodiment of Fig. 4 permits of obtaining this result.

A governor as shown by Fig. 4 is characterized in that when the speed increases, the throttled passage in the discharge conduit controlled by slide valve 124 does not decrease but on the contrary increases.

According to this embodiment, groove 124$_a$ is disposed in such manner that the throttled passage above referred to has a minimum cross section when the slide valve is in position of rest, that is to say when spring 125 applies slide valve 124 against fixed abutment 127, whereas the cross section of said throttled passage (corresponding to the portion of groove 124$_a$ located opposite conduit 21$_a$) increases more and more as the pressure in delivery conduit 18 moves slide valve 124 to a greater distance from abutment 127. An abutment 143 limits the upward displacement of slide valve 124 so as to prevent the cross section of the above mentioned throttled passage from decreasing after groove 124$_a$ has reached the position corresponding to the maximum cross section of the throttled passage.

It should also be noted that, in the pump shown by Fig. 4, cylinder 1 communicates directly with the chamber 6$_a$ of auxiliary cylinder 6 through a conduit 132 provided with a check valve 133.

When it is desired to have the cross section of the passage through groove 124$_a$ of smaller and smaller area when the speed increases, while achieving a stable positioning of slide valve 124$_a$, I may use the construction illustrated by Fig. 5 which permits of obtaining any predetermined law of variation of the pressure acting upon slide valve 124.

According to this construction, I make use, to push slide valve 124 upwardly, not of the pressure existing in delivery conduit 18 but of the pressure existing in the delivery conduit 144 of a second auxiliary pump 145 running in a continuous fashion and independent of pump 17. Said pump 145 is driven at a speed equal or proportional to that of pump 17. Consequently, when slide valve 124 moves in response to a rise of the pressure in delivery conduit 144, it increases the pressure existing in delivery conduit 18 and in branch 21 but not the pressure which is acting upon itself.

The device according to Fig. 5 makes it possible to control the pressure in delivery conduit 144 also by means of a slide valve 146 controlling a throttled passage provided in the portion 144$_a$ of conduit 144 and movable in response to the variations of any given factor which may be the speed, the atmospheric pressure, the temperature, etc.

In the embodiment illustrated by Fig. 5, slide valve 146 is movable, against the action of a return spring 147, by the fluid pressure in the delivery conduit 148 of a continuously running pump 149, the pressure in conduit 148 being obtained by means of a throttled passage 150 adjustable by means of a needle valve 151. Spring 147 may be adjusted on a screw 152.

Pump 149, together with its delivery conduit 148 and its throttled section 150, might in this case be replaced by a chamber filled with a fluid acting upon slide valve 146, the volume of this chamber varying in accordance with the variations of a parameter intended to act upon the regulation system. This chamber may be constituted by a deformable box, which may be a barometric box, intended to introduce an altitude correction or a correction depending upon the suction existing in the pipe of the engine on which the injection pump and its regulation system are mounted. In this case, it is advantageous to make use of cooperating cross sections such as shown for instance by Figs. 6, 7 and 8.

Figures 9, 10:
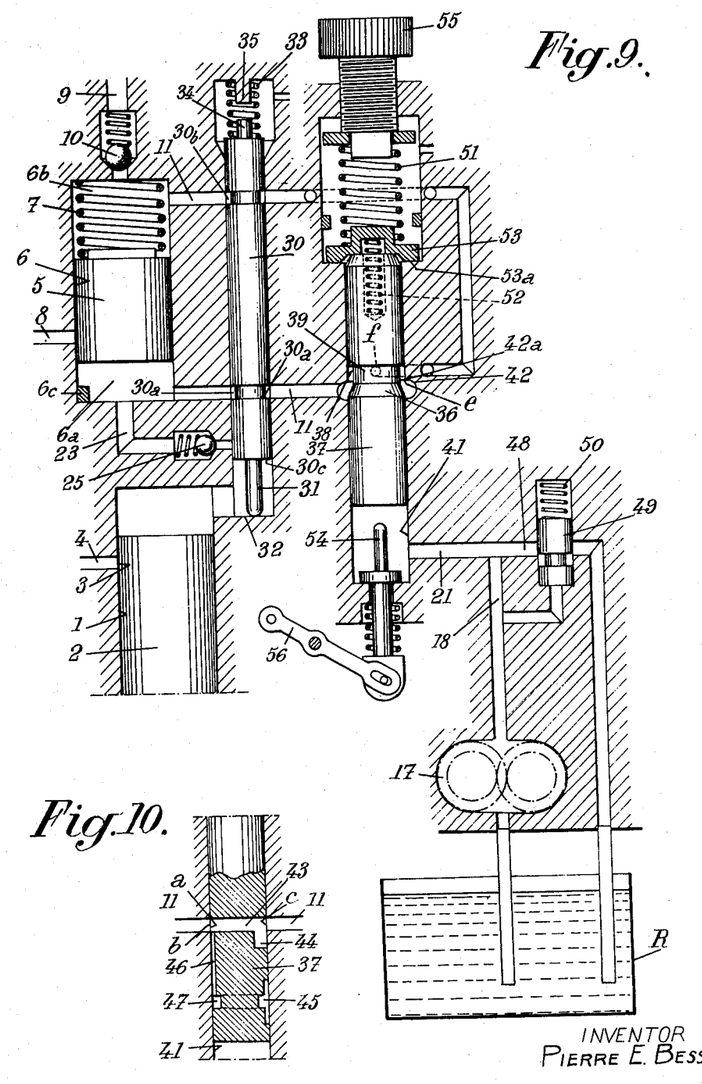
Figs. 9 and 10 diagrammatically show in axial sectional view still another embodiment of a fuel injection pump according to the invention and a modification of an element of said pump respectively.

Another embodiment of the pump according to the present invention is shown by Fig. 9.

On this figure, the reference numerals used to designate some of the parts of the pump shown by Fig. 1 designate the same parts of the pump shown by Fig. 9.

One of the essential features of the embodiment of Fig. 9 lies in the fact that in order to protect the adjustable throttled passage provided in outflow conduit 11 (and which is designated on Fig. 9 by the reference character $e$) against the action of the high pressures existing in the chambers 6$_a$ and 6$_b$ during the delivery stroke of the main pump piston 2, valve means are provided both in the portion of conduit 11 extending between chamber 6$_a$ and throttled passage $e$ and in the portion of conduit 11 extending between chamber 6$_b$ and said throttled passage. Said valve means are operative in response to the movements of main piston 2 so that during the delivery stroke of said piston 2, both of the above mentioned portions of conduit 11 are closed, said conduit portions being opened only during the next suction stroke of piston 2.

Preferably, said means are constituted by a single member in the form of a slide valve 30 provided with two grooves $30_a$ and $30_b$ (or equivalent holes extending through the slide valve), these grooves (or holes) being located on slide valve 30 so as to open both of the above mentioned portions of conduit 11 when slide valve 30 is in its lowest position, determined by the fact that a finger 31 rigid with slide valve 30 is applied against a wall 32 under the action of a return spring 33. Furthermore, advantageously, said slide valve 30 is arranged to control a conduit 23 extending between the main pump cylinder 1 and chamber $6_a$. This conduit 23 may contain a check valve 25.

If slide valve 30 is moved upwardly so that another finger 34 rigid therewith is applied against a fixed abutment 35, said slide valve closes both of the above mentioned portions of conduit 11 and opens the communication between cylinder 1 and chamber $6_a$ through conduit 23. This last mentioned action is performed at the beginning of the delivery stroke of piston 2 and may be produced by the pressure of the liquid driven by said piston 2, this liquid acting upon the end face $30_c$ of slide valve 30. The return movement of slide valve 30 toward the position shown by Fig. 9 is obtained at the beginning of the downward stroke of piston 2, under the action of spring 33.

Concerning now the variable cross section throttled passage $e$, it is formed between a fixed element and a movable element. One of these elements, preferably the movable one, includes, according to a feature of the invention, a conical surface the generatrices of which may be either rectilinear or curvilinear (either convex or concave) at the place where said last mentioned element cooperates with the other element to constitute the throttled passage.

In the embodiment illustrated by Fig. 9, such a conical surface is provided at 36 on slide valve 37 and it constitutes a portion of the bottom of a groove 38 provided in said slide valve. The other portion of the groove bottom, designated by 39, is in the form of a cylindrical surface the diameter of which is equal to the diameter of the smaller end of conical surface 36. Thus, the liquid that has flown through throttled passage $e$ can enter, through a port $f$, the portion of conduit 11 leading to chamber $6_b$. Slide valve 37 is movable in a cylinder 41 formed in the pump body and provided at the level of the groove 38 of the slide valve with a toroidal shaped chamber 42 having an upper edge $42_a$ which constitutes the element which cooperates with conical surface 36 to form the throttled passage. The portion of conduit 11 which communicates with chamber $6_a$ opens into this toroidal chamber 42.

It will be understood that the cross section of the throttled passage $e$ depends upon the axial position of slide valve 37 with respect to the fixed edge $42_a$. It is possible, by giving suitable rectilinear or curvilinear shapes to the generatrices of conical surface 36, to obtain different laws of variation of the cross section of throttled passage $e$ as a function of the variation of the axial position of slide valve 37. Furthermore, by arranging the throttled passage as above stated, there is only one throttled section of annular shape between the two portions of conduit 11 located respectively upstream and downstream of the throttled passage, which facilitates the obtainment of a throttling effect which is accurately predetermined.

Fig. 10 shows another embodiment of slide valve 37 without the conical surface. According to this embodiment, the two portions of conduit 11 which open into cylinder 41 are in line with each other and slide valve 37 is provided with a transverse channel 43 which, when slide valve 37 is moved upwardly, throttles the conduit due to the overlapping of ports $a$ and $b$, these two ports having any suitable shape (circular, triangular, ovoidal and so on). On the contrary, the other end of channel 43 is enlarged in the downward direction at 44, so that, when slide valve 37 is moved upwardly, there is no throttling of the liquid between slide valve 37 and the port $c$ of the portion of conduit 11 which leads to chamber $6_b$.

In order at least approximately to balance the transverse pressure which, at the level of ports $a$ and $b$ when said ports overlap each other, acts upon slide valve 37 and pushes it against the opposite side of cylinder 41, I provide means for transmitting the pressure existing upstream of ports $a$ and $b$ to the opposed side of slide valve 37. For instance as shown by Fig. 10, I provide in the slide valve on the side thereof opposed to ports $a$ and $b$ a recess 45 which is connected through grooves 47 and 46 with the portion of conduit 11 upstream of the slide valve.

The hydraulic pressure which is to act in the lower end of cylinder 41 upon the under face of slide valve 37 is supplied, as in the above mentioned embodiment, by a gear pump 17 driven by the engine on which the injection pump is mounted. The delivery conduit 18 of said pump 17 is connected through a branch conduit 21 with the lower end of cylinder 41, another branch conduit 48 leading back to tank R.

Advantageously, this conduit 48 is throttled as a function of the speed of the engine in such manner that the cross section of the throttled passage increases when the speed of the engine increases. For this purpose, the throttling action is exerted in conduit 48 by a slide valve 49 arranged in such manner, in response to the pressure in conduit 18, that the cross section of the throttled passage controlled by said slide valve 49 increases when said pressure rises. Slide valve 49 is urged by a spring 50 in a direction opposed to that of the action of the pressure in conduit 18.

The resilient means which exert a return action upon slide valve 37 are advantageously made as shown on Fig. 9. They include two springs, a main spring 51 and a secondary and weaker spring 52.

When the engine is stopped, the action of spring 51 upon slide valve 37 is stopped by the fact that the element 53 against which is applied the lower end of spring 51 is in contact with an abutment $53_a$ of the pump body and spring 52 pushes slide valve 37 downwardly until it is applied against an abutment 54. In this condition, slide valve 37 closes conduit 11. As soon as the engine is started, the pressure in conduit 18, which is initially low, is however sufficient to bring slide valve 37 into the position shown by Fig. 9, spring 52 being compressed and the upper end of slide valve 37 being applied against member 53. At this time, said member 53 is still applied by spring 51 against shoulder $53_a$. In this position of the parts, the throttled passage $e$ has its maximum cross section.

If the pressure in conduit 18, due to the fact that the engine is accelerating, rises to a value such that it compresses spring 51, slide valve 37 rises in cylinder 41 and reduces the cross section of throttled passage $e$, thus tending to cause the formation of a "liquid abutment" in the chamber $6_a$ of cylinder 6.

When the engine reaches the maximum speed it is allowed to have, slide valve 37 wholly closes the throttled passage $e$ so that no fuel is injected into the engine cylinders.

By varying the compression of spring 51 by means for instance of an adjustment screw 55, it is possible to give this maximum speed any desired value. The fineness of regulation may be easily adjusted by adjusting the strength of spring 50 which acts upon slide valve 49. It is therefore possible to obtain an "all speeds" regulation with a fineness either constant or variable.

It is possible to stop the engine by acting upon adjustment screw 55 in such manner as to make the load of spring 51 equal to zero. The some result may be obtained by making abutment 54 movable toward the inside of cylinder 41. When this abutment 54 is moved upwardly for instance by means of the mechanism acting on said abutment through a lever 56, the throttled passage e may be wholly closed, which stops the injection of fuel. When the stopping of the engine is obtained by means of such a movable abutment 54, there is no risk of modifying the adjustment of spring 51, as this is the case when the engine is stopped by reducing the load of this spring to zero.

In some cases, in particular when the engine fed through the pump has a great number of cylinders or when this engine is running at high speed, it is difficult to obtain the necessary number of fuel injections per cycle by means of a single pump piston 2 working in a cylinder 1. In order to obviate this difficulty, it is advantageous to make use of two or several pump units (each including a cylinder 1, a piston 2, a shuttle piston 5 and so on) which work successively so as to ensure the injection of fuel into the respective cylinder of the engine. The pistons of these pump units may be actuated by a single cam or by several cams. In this case, in order to make the delivery rates of the respective pump units exactly equal to one another, I use, according to a feature of the invention, a single valve member to vary the throttled passage inserted in each of the conduits 11.

Figure 11:
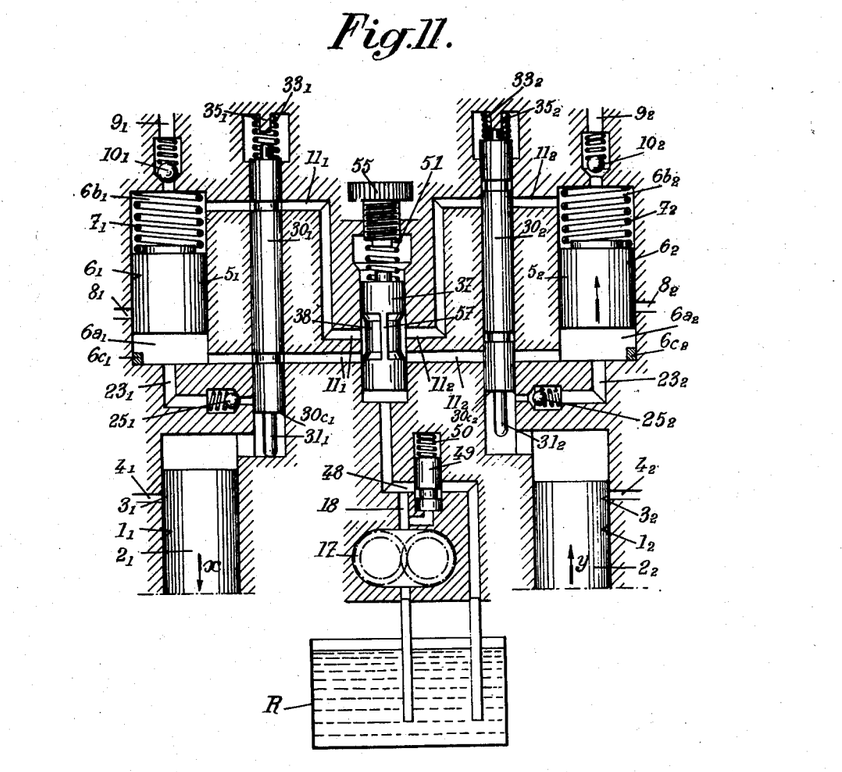
Figs. 11 and 12 diagrammatically show in axial sectional view a fuel injection double pump according to the invention and a modification of an element of this pump.

Fig. 11 shows a pump including two such pump units. The reference numerals are the same as on Fig. 9. However, the reference numerals of one pump unit are provided with subscript 1 and those of the other with subscript 2. The two pump units work with a phase difference of 180°, as indicated by arrows $x$ and $y$.

As shown by Fig. 11, a single slide valve 37 controls the throttled passages in the respective conduits $11_1$ and $11_2$ of the pump units. This slide valve is controlled by means 17 and 49 as above described. Slide valve 37 is provided with a partition 57 dividing the groove 38 of this slide valve into two portions cooperating respectively with conduit $11_1$ and $11_2$. Thus, conduit $11_1$ cannot communicate with conduit $11_2$.

Figure 12:
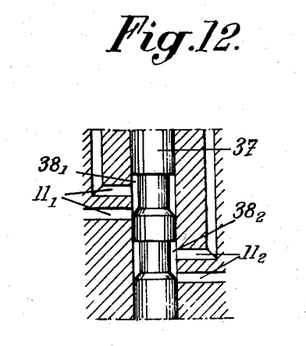

Fig. 12 shows a modification of this slide valve. In this modification, the slide valve is provided with two grooves $38_1$ and $38_2$ cooperating respectively with conduit $11_1$ and $11_2$.

It should be well understood that the upward or forward stroke of shuttle member 5 are not necessarily obtained through the action of the liquid driven by piston 2. Shuttle 5 might be operatively connected with piston 2 during the upward stroke thereof through other means, for instance mechanical means.

In general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A reciprocating action liquid pump which comprises, in combination, a main pump cylinder, a main pump piston reciprocable in said cylinder, said main cylinder being provided at one end thereof with an outlet passage, the strokes of said main piston toward said end of said main cylinder being called delivery strokes, an auxiliary cylinder fixed with respect to said main cylinder and connected at one end with said outlet passage, valve means in said outlet passage to permit liquid circulation therethrough from said main cylinder to said auxiliary cylinder but to prevent circulation therethrough in the opposed direction, a shuttle piston reciprocable in said auxiliary cylinder so as to be given a displacement in one direction in response to every delivery stroke of said main piston, resilient means for opposing such a displacement in said direction of said shuttle and for urging said shuttle piston in the opposed direction on its return stroke during every return stroke of said main piston, a conduit connected with said auxiliary cylinder, said conduit being arranged for the flow therethrough of the liquid delivered from said auxiliary cylinder during every return stroke of said shuttle piston, valve means in said conduit operative by said main piston for closing said conduit during every delivery stroke of said main piston and for opening said conduit during every stroke of said main piston in the opposed direction, an adjustable throttled passage in said conduit, and automatic means responsive to variations of a regulation factor for varying the cross section of said throttled passage in accordance with the value of said factor.

2. A reciprocating action liquid pump which comprises, in combination, a main pump cylinder, a main pump piston reciprocable in said cylinder, said main cylinder being provided at one end thereof with an outlet, the strokes of said main piston toward said end of said main cylinder being called delivery strokes, an auxiliary cylinder fixed with respect to said main cylinder, a shuttle piston reciprocable in said auxiliary cylinder, said shuttle piston dividing said auxiliary cylinder into two chambers, an inflow conduit forming a communication between said main cylinder outlet and one of said chambers, valve means in said inflow conduit to permit liquid circulation therethrough from said main cylinder to said last mentioned chamber of said auxiliary cylinder but to prevent circulation therethrough in the opposed direction, so that every delivery stroke of said main piston produces, by hydraulic transmission, a forward stroke of said shuttle piston, resilient means for opposing such forward strokes of said shuttle piston and for moving said shuttle piston in the opposed direction on its return stroke during every return stroke of said main piston, an outflow conduit leading out from said chamber of said auxiliary cylinder for the liquid forced back from said chamber by said shuttle piston on every return stroke thereof, valve means in said outflow conduit operative by said main piston for closing said outflow conduit during every delivery stroke of said main piston and for opening said outflow conduit during every stroke of said main piston in the opposed direction, and a throttle valve mounted in said outflow conduit to form a variable throttled passage therein, whereby the flow of liquid through said outflow conduit is more or less braked according to the position of said throttle valve, said throttle valve being responsive to variations of the mean speed of said main piston so as to have its position varied in accordance with the value of said speed.

3. A pump according to claim 2 in which said throttle valve is arranged so that, at least for values of said speed above a given minimum value, the throttling of said outflow conduit increases when said speed increases.

4. A pump according to claim 2 further including means for adjusting the cross-sectional area of said outflow conduit throttled passage.

5. A pump according to claim 2 in which said throttle valve includes two parts movable with respect to each other, said parts being provided with respective ports communicating with said outflow conduit and adjacent to each other so that the portions thereof common to both of them constitute said throttled passage, the shapes of said ports being chosen such that relative displacement of said ports achieves a variation of the cross section of said passage according to a predetermined law.

6. A pump according to claim 2 further including means for adjustably limiting the opening displacements of at least one of said valve means with respect to said outflow conduit.

7. A pump according to claim 2 in which said throttle valve includes an element having an active portion in the form of a frustum of a cone.

8. A pump according to claim 2 including a resilient device for urging said throttle valve in one direction, said resilient device including a movable member, a strong spring interposed between a fixed part of the pump and said movable member and a weak spring interposed between said movable member and said throttle valve, said movable member being adapted to cooperate with a fixed part of the pump against which it is applied by said strong spring, said throttle valve being fully opened when said movable member is thus applied against said fixed part of the pump and said weaker spring is fully compressed between said member and said throttle valve and said throttle valve being arranged gradually to throttle said outflow conduit when it is moved in either direction from said fully opened position.

9. A pump according to claim 2 in which said throttle valve is a slide valve movable transversely to said outflow conduit, said slide valve being provided with grooves in communication with said conduit, said grooves being arranged to balance the pressure exerted by the liquid flowing through said outflow conduit.

10. A multiple pump including a plurality of pumps according to claim 2, said throttle valve being common to all of said pumps.

11. A reciprocating action liquid pump which comprises, in combination, a main pump cylinder, a main pump piston reciprocable in said cylinder, said main cylinder being provided at one end thereof with an outlet, the strokes of said main piston toward said end of said main cylinder being called delivery strokes, an auxiliary cylinder fixed with respect to said main cylinder, a shuttle piston reciprocable in said auxiliary cylinder, said shuttle piston dividing said auxiliary cylinder into two chambers, an inflow conduit forming a communication between said main cylinder outlet and one of said chambers, valve means in said inflow conduit to permit liquid circulation therethrough from said main cylinder to said last mentioned chamber of said auxiliary cylinder but to prevent circulation therethrough in the opposed direction, so that every delivery stroke of said main piston produces, by hydraulic transmission, a forward stroke of said shuttle piston, resilient means for opposing such forward strokes of said shuttle piston and for moving said shuttle piston in the opposed direction on its return stroke during every return stroke of said main piston, an outflow conduit leading out from said chamber of said auxiliary cylinder for the liquid forced back from said chamber by said shuttle piston on every return stroke thereof, valve means in said outflow conduit operative by said main piston for closing said outflow conduit during every delivery stroke of said main piston and for opening said outflow conduit during every delivery stroke of said main piston in the opposed direction, a throttle valve mounted in said outflow conduit, whereby the flow of liquid through said outflow conduit is more or less braked according to the position of said throttle valve, an auxiliary pump driven at a speed proportional to the mean speed of said main piston, said auxiliary pump being of the type which has a volumetric flow rate proportional to the speed at which it is driven, said auxiliary pump having a delivery circuit, throttling means in said delivery circuit to produce a liquid pressure in the portion of said delivery circuit extending between said auxiliary pump and said throttling means, and means responsive to variations of a liquid pressure acting thereon connected with said portion of said delivery conduit for controlling said throttle valve in response to variations of said liquid pressure.

12. A pump according to claim 1 further comprising a second auxiliary pump, throttling means in the delivery circuit of said last mentioned pump and means operative by the delivery pressure of said last mentioned pump for operating said throttling means of the delivery circuit of the first mentioned auxiliary pump.

13. A reciprocating action liquid pump which comprises, in combination, a main pump cylinder, a main pump piston reciprocable in said cylinder, said main cylinder being provided at one end thereof with an outlet, the strokes of said main piston toward said end of said main cylinder being called delivery strokes, an auxiliary cylinder fixed with respect to said main cylinder, a shuttle piston reciprocable in said auxiliary cylinder, said shuttle piston dividing said auxiliary cylinder into two chambers, an inflow conduit forming a communication between said main cylinder outlet and one of said chambers, valve means in said inflow conduit to permit liquid circulation therethrough from said main cylinder to said last mentioned chamber of said auxiliary cylinder but to prevent circulation therethrough in the opposed direction, so that every delivery stroke of said main piston produces, by hydraulic transmission, a forward stroke of said shuttle piston, resilient means for opposing such forward strokes of said shuttle piston and for moving said shuttle piston in the opposed direction on its return stroke during every return stroke of said main piston, an outflow conduit leading out from said chamber of said auxiliary cylinder for the liquid forced back from said chamber by said shuttle piston on every return stroke thereof, valve means in said outflow conduit operative by said main piston for closing said outflow conduit during every delivery stroke of said main piston and for opening said outflow conduit during every delivery stroke of said main piston in the opposed direction, a throttle valve mounted in said outflow conduit, whereby the flow of liquid through said outflow conduit is more or less braked according to the position of said throttle valve, an auxiliary pump driven at a speed proportional to the mean speed of said main piston, said auxiliary pump being of the type which has a volumetric flow rate proportional to the speed at which it is driven, said auxiliary pump having a delivery circuit, throttling means in said delivery circuit to produce a liquid pressure in the portion of said delivery circuit extending between said auxiliary pump and said throttling means, said throttling means including a slide valve slidable transversely to said delivery circuit, conduit means for transmitting to one end of said slide valve the liquid pressure in said delivery circuit portion and resilient means for opposing the thrust of said liquid pressure on said slide valve, and means responsive to variations of a liquid pressure acting thereon connected with said portion of said delivery conduit for controlling said throttle valve in response to variations of said liquid pressure.

14. A pump according to claim 13 in which said slide valve is arranged so that the throttling of said auxiliary pump delivery circuit by said throttling means is reduced when said liquid pressure in said delivery circuit is increased.

15. A reciprocating action liquid pump which comprises, in combination, a main pump cylinder, a main pump piston reciprocable in said cylinder, said main cylinder being provided at one end thereof with an outlet, the strokes of said main piston toward said end of said main cylinder being called delivery strokes, an auxiliary cylinder fixed with respect to said main cylinder, a shuttle piston reciprocable in said auxiliary cylinder, said shuttle piston dividing said auxiliary cylinder into two chambers, an inflow conduit forming a communication between said main cylinder outlet and one of said chambers, valve means in said inflow conduit to permit liquid circulation therethrough from said main cylinder to said last mentioned chamber of said auxiliary cylinder but to prevent circulation therethrough in the opposed direction, so that every delivery stroke of said main piston produces, by hydraulic transmission, a forward stroke of said shuttle piston, resilient means for opposing such forward strokes of said shuttle piston and for moving said shuttle piston in the opposed direction on its return stroke during every return stroke of said main piston, an outflow conduit leading out from said chamber of said auxiliary cylinder and to the other of said chambers for conveying the liquid forced back from said first mentioned chamber by said shuttle piston on every return stroke thereof to the second mentioned chamber a delivery conduit starting from said second mentioned chamber, valve means in said outflow conduit operative by said main piston for closing said outflow conduit during every delivery stroke of said main piston and for opening said outflow conduit during every delivery stroke of said main piston in the opposed direction, a throttle valve mounted in said outflow conduit to form a variable throttled passage therein, whereby the flow of liquid through said outflow conduit is more or less braked according to the position of said throttle valve, and valve means in said outflow conduit, operative by the liquid pressure in said main cylinder for cutting off said throttle valve from both of said chambers during every delivery stroke of said main pump piston.

16. A reciprocating action liquid pump which comprises, in combination, a main pump cylinder, a main pump piston reciprocable in said cylinder, said main cylinder being provided at one end thereof with an outlet, the strokes of said main piston toward said end of said main cylinder being called delivery strokes, an auxiliary cylinder fixed with respect to said main cylinder, a shuttle piston reciprocable in said auxiliary cylinder, said shuttle piston dividing said auxiliary cylinder into two chambers, an inflow conduit forming a communication between said main cylinder outlet and one of said chambers so that every delivery stroke of said main piston produces, by hydraulic transmission, a forward stroke of said shuttle piston, resilient means for opposing such forward strokes of said shuttle piston and for moving said shuttle piston in the opposed direction on its return stroke during every return stroke of said main piston, an outflow conduit leading out from said chamber of said auxiliary cylinder for the liquid forced back from said chamber by said shuttle piston on every return stroke thereof, and a slide valve movable across both of said conduits and operative in response to the movements of said main piston so as to close said outflow conduit and open said inflow conduit during the delivery strokes of said main piston and to open said outflow conduit and close said inflow conduit during the suction strokes of said main piston.

References Cited in the file of this patent
UNITED STATES PATENTS

| | | |
|---|---|---|
| 2,281,045 | Outin | Apr. 28, 1942 |
| 2,575,677 | Neu | Nov. 20, 1951 |
| 2,576,747 | Bryant | Nov. 27, 1951 |

FOREIGN PATENTS

| | | |
|---|---|---|
| 402,603 | Great Britain | Dec. 7, 1933 |